(12) United States Patent
Zhang et al.

(10) Patent No.: US 12,087,483 B2
(45) Date of Patent: Sep. 10, 2024

(54) DUAL PHASE SOFT MAGNETIC PARTICLE COMBINATIONS, COMPONENTS AND MANUFACTURING METHODS

(71) Applicant: General Electric Company, Schenectady, NY (US)

(72) Inventors: Wanming Zhang, Clifton Park, NY (US); Ananda Barua, Glenville, NY (US); Shenyan Huang, Niskayuna, NY (US); Changjie Sun, Clifton Park, NY (US); Vandana Prabhakar Rallabandi, Niskayuna, NY (US); Anthony Joseph Vinciquerra, Rexford, NY (US); Min Zou, San Jose, CA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 17/670,836

(22) Filed: Feb. 14, 2022

(65) Prior Publication Data
US 2023/0260687 A1   Aug. 17, 2023

(51) Int. Cl.
*H01F 1/24* (2006.01)
*C22C 19/00* (2006.01)
*H01F 1/147* (2006.01)

(52) U.S. Cl.
CPC .............. *H01F 1/24* (2013.01); *C22C 19/00* (2013.01); *H01F 1/1475* (2013.01); *C22C 2202/02* (2013.01)

(58) Field of Classification Search
CPC ......... H01F 1/24; H01F 1/1475; C22C 19/00; C22C 2202/02
See application file for complete search history.

(56) References Cited

U.S. PATENT DOCUMENTS

| | | | |
|---|---|---|---|
| 6,255,005 B1 | 7/2001 | Yokoyama et al. |
| 6,675,460 B2 | 1/2004 | Reiter, Jr. et al. |
| 7,146,708 B2 | 12/2006 | Reiter, Jr. et al. |
| 8,354,037 B2 | 1/2013 | Harada et al. |
| 8,840,800 B2 | 9/2014 | Suetsuna et al. |
| 9,634,549 B2 | 4/2017 | Dial et al. |
| 9,803,139 B1 | 10/2017 | Bonitatibus, Jr. et al. |
| 10,190,206 B2 | 1/2019 | Dial et al. |
| 10,229,776 B2 | 3/2019 | Johnson et al. |
| 10,229,777 B2 | 3/2019 | Zou et al. |

(Continued)

FOREIGN PATENT DOCUMENTS

| | | |
|---|---|---|
| CN | 110014144 A | 7/2019 |
| CN | 110164677 A | 8/2019 |

(Continued)

OTHER PUBLICATIONS

WO-2016162383-A1: Espacenet English machine translation (Year: 2016).*

*Primary Examiner* — Adil A. Siddiqui
(74) *Attorney, Agent, or Firm* — Dority & Manning, P.A.

(57) ABSTRACT

Methods for manufacturing dual phase soft magnetic components include combining a plurality of soft ferromagnetic particles with a plurality of paramagnetic particles to form a component structure, wherein the plurality of soft ferromagnetic particles each comprise an electrically insulative coating, and, heat treating the component structure to consolidate the plurality of soft ferromagnetic particles with the plurality of paramagnetic particles.

15 Claims, 3 Drawing Sheets

(56) References Cited

U.S. PATENT DOCUMENTS

| | | | |
|---|---|---|---|
| 10,483,037 B2 | 11/2019 | Lambourne et al. | |
| 10,673,288 B2 | 6/2020 | Kool et al. | |
| 10,916,269 B2 | 2/2021 | Takahashi et al. | |
| 10,931,157 B2 | 2/2021 | Johnson et al. | |
| 10,937,576 B2 | 3/2021 | Suetsuna et al. | |
| 2008/0008897 A1* | 1/2008 | Imagawa | H01F 1/24 |
| | | | 428/570 |
| 2008/0248245 A1 | 10/2008 | Maeda et al. | |
| 2008/0258102 A1 | 10/2008 | Hirose et al. | |
| 2010/0193726 A1 | 8/2010 | Maeda et al. | |
| 2011/0097584 A1 | 4/2011 | Takahashi et al. | |
| 2014/0104023 A1* | 4/2014 | Yang | B22F 1/16 |
| | | | 428/407 |
| 2014/0349099 A1 | 11/2014 | Kawashita et al. | |
| 2017/0186521 A1 | 6/2017 | Nakamura et al. | |
| 2018/0193916 A1 | 7/2018 | Lou et al. | |
| 2018/0218824 A1* | 8/2018 | Kothandaraman | H01F 27/02 |
| 2018/0261363 A1* | 9/2018 | Lee | B22F 10/36 |
| 2020/0207022 A1 | 7/2020 | Benedict et al. | |
| 2021/0057149 A1 | 2/2021 | Paranthaman et al. | |
| 2021/0139953 A1* | 5/2021 | Corpstein | C12Q 1/6806 |
| 2021/0142933 A1 | 5/2021 | Herbert et al. | |

FOREIGN PATENT DOCUMENTS

| | | | | |
|---|---|---|---|---|
| JP | 2005085967 A | | 3/2005 | |
| JP | 2006233325 A | | 9/2006 | |
| JP | 2009130286 A | | 6/2009 | |
| WO | WO-2016162383 A1 * | 10/2016 | | B22F 1/0085 |

* cited by examiner

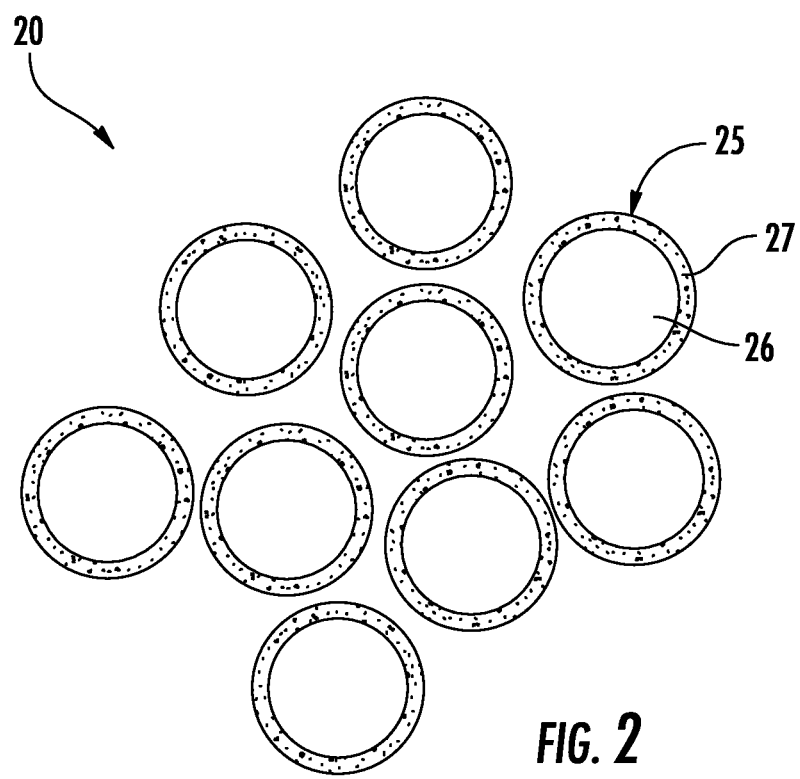
FIG. 2
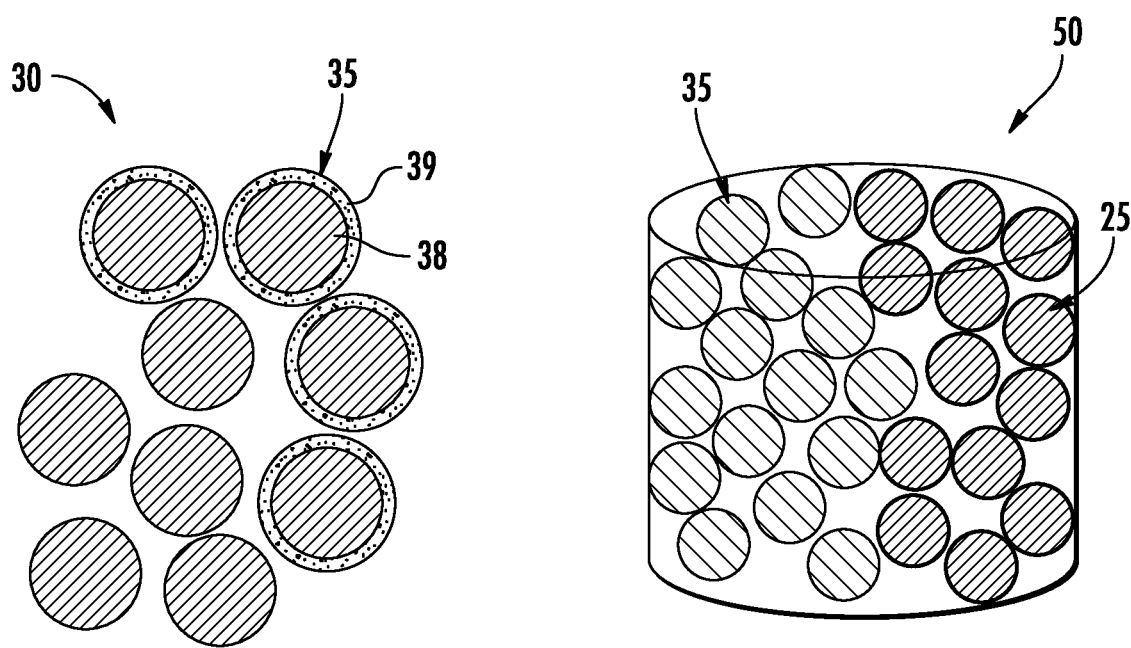
FIG. 3
FIG. 4

DUAL PHASE SOFT MAGNETIC PARTICLE COMBINATIONS, COMPONENTS AND MANUFACTURING METHODS

FIELD

The present disclosure relates generally to multi-material metallurgy, and more particularly, dual phase soft magnetic particle combinations, components, and manufacturing methods.

BACKGROUND

Electrical machines, such as electric motors and generators, may use high power density and high efficiency components for a variety of applications. For example, such motors and generators may be used in automobile, aviation, robotic, and/or appliance applications. Power density of these electric machines may depend in part on machine size, thermal management, rotor speed, and/or magnetic utilization.

For example, in some applications, rotational speeds may be increased to raise the machine's power density, and thereby potentially reduce its mass and cost. However, increasing the rotational speed may lead to a potential tradeoff between power density, efficiency, and the machine's constant power limited by rotor mechanical strength.

Similarly, power density may be influenced by increasing magnetic utilization. For example, the process of selective nitriding can involve selectively masking areas on the surface of a component containing a magnetic ferrous material and applying nitrogen gas to the component. The magnetic ferrous material on the surface of the component at the unmasked areas can be transformed by the nitrogen gas into a nonmagnetic austenite composition, while the ferromagnetic nature of the component's surface at the masked areas can be left substantially unaltered. However, selective nitriding may lead to two-dimensional magnetic flux on the surface of the component, thereby impacting power density and efficiency of the machine.

Accordingly, alternative processes for magnetic utilization, such as through dual-phase soft magnetic particle combinations, components, and manufacturing methods, would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 2 illustrates a plurality of soft ferromagnetic particles in accordance with one or more exemplary aspects of the present disclosure.

FIG. 3 illustrates a plurality of paramagnetic particles in accordance with one or more exemplary aspects of the present disclosure.

FIG. 4 illustrates a component structure comprising dual phase soft magnetic particle combination in accordance with one or more exemplary aspects of the present disclosure.

Figure 1A:
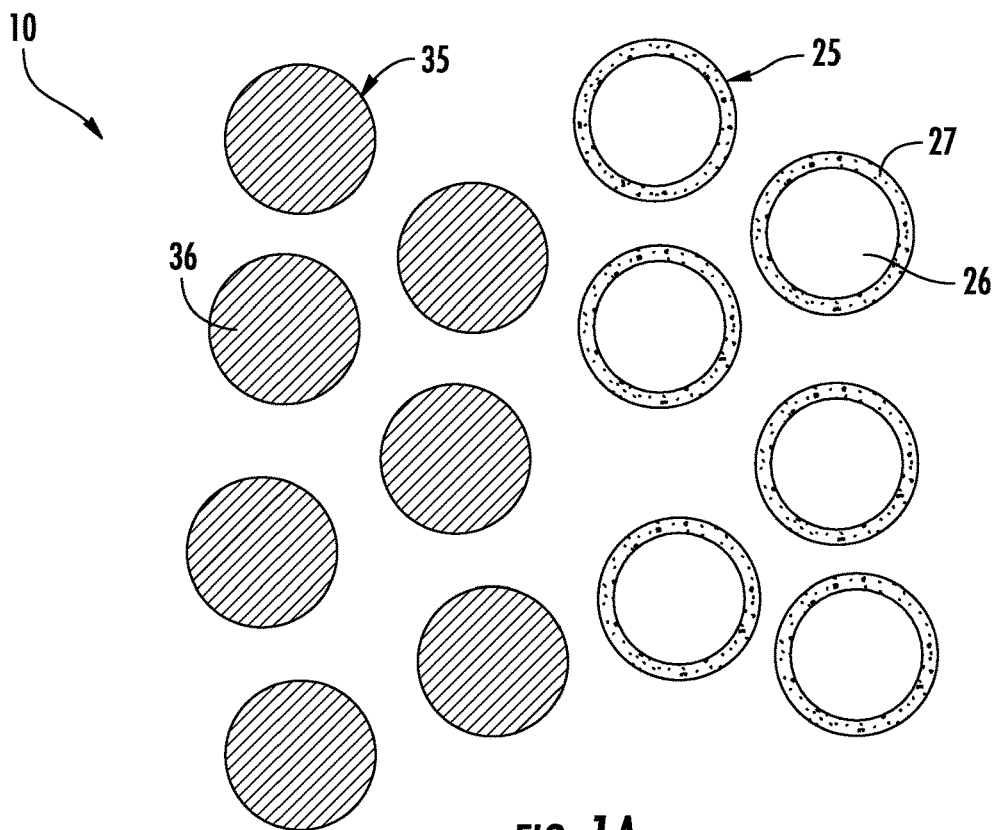
FIGS. 1A and 1B illustrate dual phase soft magnetic particle combinations in accordance with one or more exemplary aspects of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, "combination", "combinations" and the like are used to describe any collection of different materials, whether or not said materials are adjacent one another, interspersed, or partially mixed and whether or not the combination of different materials is symmetrical.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

As used herein, the term "additive manufacturing" refers generally to manufacturing technology in which components are manufactured in a layer-by-layer manner. An exemplary additive manufacturing machine may be configured to utilize any desired additive manufacturing technology.

The present disclosure is generally related to dual phase soft magnetic particle combinations, components, and methods for making the same. A plurality of soft ferromagnetic particles can be combined with a plurality of paramagnetic particles to form dual phase soft magnetic components and/or dual phase soft magnetic particle combinations (such as for being used to form dual phase soft magnetic components).

The plurality of soft ferromagnetic particles can each include an electrically insulative coating surrounding the soft ferromagnetic core. The plurality of paramagnetic particles can each comprise an insulative component, such as through nonmagnetic electrically insulative coating around a conductive particle.

As disclosed herein, the combination of soft ferromagnetic particles (with electrically insulative coatings) and paramagnetic particles can thereby increase magnetic saturation of dual phase components. Such dual phase soft magnetic components may provide, for example, higher saturation flux density and/or lower eddy current loss in electrical components. Moreover, the dual phase soft magnetic components disclosed and discussed herein may have a three dimensional magnetic flux flow direction from the isotropic structure of the parts. That is, the localized magnetic and non-magnetic regions can reduce flux losses due to the relatively low and high magnetic permeability of the different regions with respect to one another. For instance, the magnetic regions can constrain the path of magnetic flux while the non-magnetic regions can enable the path for magnetic flux. Resulting dual phase soft magnetic components can be used in, for example, axial and/or transverse flux machines such as for motors and generators in automobile, aviation, robotic, and/or appliance applications with improved continuous and peak power outputs, power density, power factor, and/or efficiency.

Figure 1B:
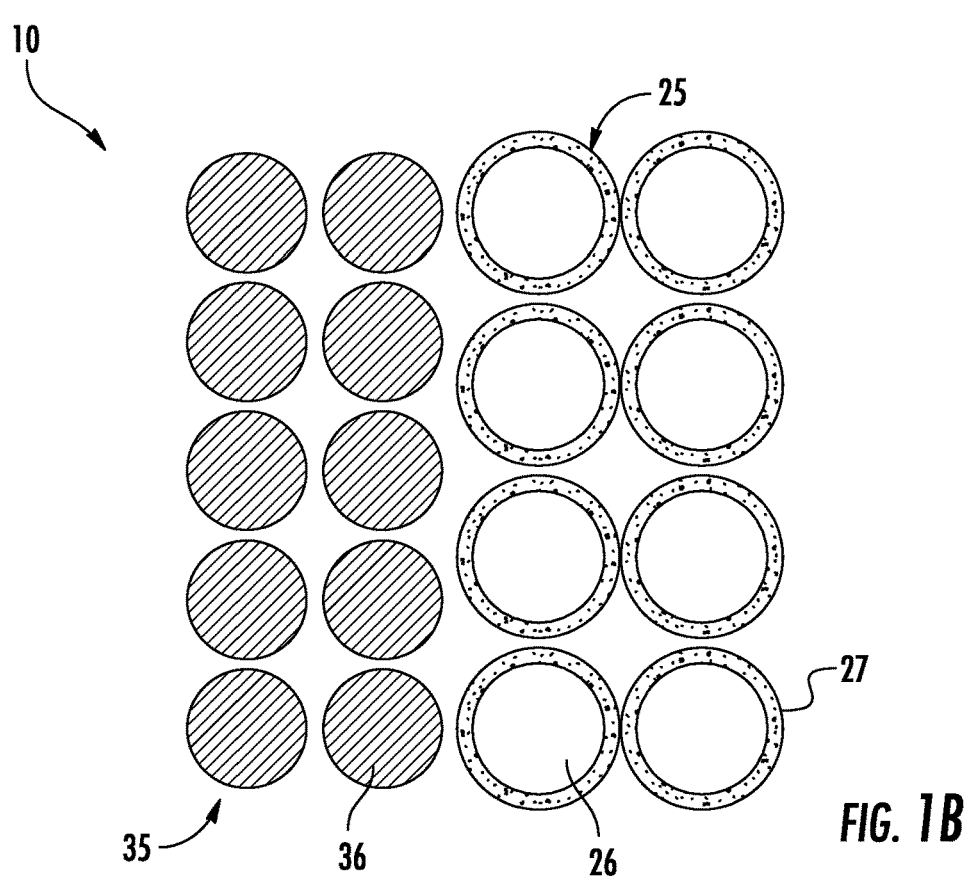

Referring now to the drawings, wherein identical numerals indicate the same elements throughout the figures, FIGS. 1-3 schematically illustrate a dual phase soft magnetic particle combination 10 and constituents thereof. The dual phase soft magnetic particle combination 10 can generally comprise a plurality of soft ferromagnetic particles 20 and a plurality of paramagnetic particles 30.

With specific reference to FIG. 1, it should be appreciated that the plurality of soft ferromagnetic particles 20 and the plurality of paramagnetic particles 30 may be combined to produce the dual phase soft magnetic particle combination 10 in a variety of configurations. As defined from above, and now with further specific reference to the dual phase soft magnetic particle combination 10, "combination" refers to any combination of the plurality of soft ferromagnetic particles 20 and the plurality of paramagnetic particles 30, whether or not the plurality of soft ferromagnetic particles 20 and the plurality of paramagnetic particles 30 are adjacent one another in respective regions or partially mixed with one another, and whether or not the combination of the plurality of soft ferromagnetic particles 20 and the plurality of paramagnetic particles 30 is symmetrical.

For example, the plurality of soft ferromagnetic particles 20 and the plurality of paramagnetic particles 30 may be located within their own respective regions adjacent to one another, such as is illustrated in FIG. 1. That is, individual soft ferromagnetic particles 20 and individual paramagnetic particles 30 may have little or negligible direct mixing with one another such that respective groups of the plurality of soft ferromagnetic particles 20 and the plurality of paramagnetic particles 30 are merely adjacent to one another within the dual phase soft magnetic particle combination 10, or anything therebetween. Alternatively, the plurality of soft ferromagnetic particles 20 and the plurality of paramagnetic particles 30 may comprise a partial mixing, wherein both the plurality of soft ferromagnetic particles 20 and the plurality of paramagnetic particles 30 are partially mixed within the dual phase soft magnetic particle combination 10 in different concentrations.

Thus, in some embodiments, the dual phase soft magnetic particle combination 10 may essentially comprise a heterogeneous combination of the plurality of soft ferromagnetic particles 20 and a plurality of paramagnetic particles 30, wherein different regions are comprised of the same respective types of particles. In such embodiments, the dual phase soft magnetic particle combination 10 may comprise at a minimum, two distinct regions wherein one comprises the plurality of soft ferromagnetic particles 20 and the other comprises the plurality of paramagnetic particles 30. In further embodiments, multiple regions may be present of the respective plurality of soft ferromagnetic particles 20 and plurality of paramagnetic particles 30 such as through layering, stacking, or other variations, either symmetrically or asymmetrically.

Referring now to FIGS. 1-2, the plurality of soft ferromagnetic particles 20 generally comprise individual soft ferromagnetic particles 25 each having a soft ferromagnetic core 26 and a soft magnetic electrically insulative coating 27. The soft ferromagnetic core 26 of the individual soft ferromagnetic particle 25 can comprise any ferromagnetic material, such as materials having a high-saturation of iron. The soft ferromagnetic core 26 may comprise one or more materials having a relatively low intrinsic coercivity for the ease of magnetization and demagnetization. For example, in some embodiments, the soft ferromagnetic core 26 may comprise one or more materials having an intrinsic coercivity of less than 1000 A/m, or even less than 100 A/m. In some embodiments, the soft ferromagnetic core 26 may comprise iron cobalt, iron silicone, pure iron, iron phosphate, and/or other iron containing magnetic powders or combinations thereof.

In some embodiments, the soft ferromagnetic core 26 may comprise a minimum intrinsic saturation flux density such as higher than about 0.4 tesla, higher than about 1.3 tesla, higher than about 1.5 tesla, or higher than about 1.7 tesla. As used herein intrinsic saturation flux density refers to the magnetic flux density of the material at the point when no further increase in applied external magnetic field increases the magnetic flux density (the total flux divided by the cross sectional area through which it flows) of the material (e.g., the point when the magnetization levels off). Such embodiments may increase the overall magnetic flux of a final component in one or more regions depending on the dispersion of the plurality of soft ferromagnetic particles 20 in the dual phase soft magnetic particle combination 10.

Each individual soft ferromagnetic particle 25 can further comprise a soft magnetic electrically insulative coating 27 around the soft ferromagnetic core 26. The soft magnetic electrically insulative coating 27 can comprise any electrically nonconductive soft magnetic material or materials that can at least partially electrically insulate the soft ferromagnetic core 26. For example, in some embodiments the soft magnetic electrically insulative coating 27 can comprise a material having electrical resistance at least 50%, 75%, or 100% greater than the electrical resistance of the soft ferromagnetic core 26. In some embodiments, the soft magnetic electrically insulative coating 27 may comprise, for example, a ferrite based material such as nickel zinc ferrite. The soft magnetic electrically insulative coating 27 around the soft ferromagnetic core 26 may, for example, limit eddy current loss in a component comprising a plurality of soft ferromagnetic particles 20 such as those disclosed herein.

The plurality of soft ferromagnetic particles 20 may comprise a variety of overall shapes, sizes, and combinations. For example, in some embodiments, the plurality of soft ferromagnetic particles 20 may generally comprise an average particle size, wherein particle size refers to the largest dimension across an individual particle, and wherein average particle size refers to the average value for the plurality, of from 0.001 mm to 0.5 mm, or from 0.01 mm to 0.4 mm, or from 0.1 mm to 0.3 mm. The plurality of soft ferromagnetic particles 20 may comprise substantially similar particle sizes or may comprise a variety of different particle sizes such as through a multimodal distribution of various particle sizes.

The soft magnetic electrically insulative coating 27 of the plurality of soft ferromagnetic particles 20 can comprise a variety of different thicknesses. For example, in some embodiments, the soft magnetic electrically insulative coating 27 of the plurality of soft ferromagnetic particles 20 may have an average thickness of from 0.001 mm to 0.01 mm, or from 0.005 to 0.009 mm. In some embodiments, the soft magnetic electrically insulative coating 27 may comprise a substantially uniform thickness around the entire surface of an individual soft ferromagnetic particle 25. In some embodiments, the soft magnetic electrically insulative coating 27 may comprise a non-uniform thickness around an individual soft ferromagnetic particle 25, such as wherein the thickness of the soft magnetic electrically insulative coating 27 varies at different locations across the individual soft ferromagnetic particle 25. Such uniformities or variations in thickness may be an intended design selection or merely an acceptable byproduct of a particular manufacturing process.

In some embodiments, each individual soft ferromagnetic particle 25 may be substantially spherical. In some embodiments, each individual soft ferromagnetic particle 25 may be non-spherical such as by having asymmetrical geometries. In some embodiments, the plurality of soft ferromagnetic particles 20 may comprise a plurality of different shapes, such as a combination of spherical and asymmetrical particles. Moreover, the plurality of soft ferromagnetic particles 20 may all comprise substantially the same shape, or may comprise a variety of different shapes.

The plurality of soft ferromagnetic particles 20 can be uniform, distinct, or a combination thereof. Moreover, in some embodiments, the plurality of soft ferromagnetic particles 20 may be combined with one or more various additives such as when provided in a collective powder or other form. In such embodiments, the optional one or more additional additives may comprise any material that may be utilized in powder metallurgy such as, for example, one or more consolidating agents (e.g., sintering agents).

The plurality of soft ferromagnetic particles 20 can comprise a plurality of soft ferromagnetic particles 20 that are substantially uniform with one another, or may comprise a plurality of soft ferromagnetic particles 20 that comprise one or more variations in one or more measurements and/or properties between individual soft ferromagnetic particles 25. For example, in some embodiments the plurality of soft ferromagnetic particles 20 may all comprise substantially the same composition (i.e., similar compositions in soft ferromagnetic cores 26 and soft magnetic electrically insulative coatings 27 for each individual soft ferromagnetic particle 25). In some embodiments, the plurality of soft ferromagnetic particles 20 may comprise some individual soft ferromagnetic particles 25 having a soft ferromagnetic core 26 of a first size, shape, and composition, and some individual soft ferromagnetic particles 25 having a soft ferromagnetic core of a second size, shape, and composition, wherein at least one of the size, shape, and composition parameters are different between the soft ferromagnetic cores 26. Likewise, the plurality of soft ferromagnetic particles 20 may comprise some individual soft ferromagnetic particles 25 having an soft magnetic electrically insulative coating 27 core of a first size, shape, and composition, and some individual soft ferromagnetic particles 25 having a soft magnetic electrically insulative coating 27 of a second size, shape, and composition, wherein at least one of the size, shape, and composition parameters are different between the soft magnetic electrically insulative coatings 27. It should thus be appreciated that the plurality of soft ferromagnetic particles 20 may comprise the same or different compositions and/or properties within the scope of the embodiments disclosed herein.

Referring now to FIGS. 1 and 3, the dual phase soft magnetic particle combination 10 further comprises a plurality of paramagnetic particles 30. Each individual paramagnetic particle of 35 of the plurality of paramagnetic particles 30 can generally comprise a paramagnetic and electrically insulative core 36 comprising any nonmagnetic material. For example, in some embodiments, the plurality of paramagnetic particles 30 can comprise austenitic steels, nickel based alloys, iron oxides or combinations thereof.

For example, in some embodiments, such as that illustrated in FIG. 1 each individual paramagnetic particle 35 may comprise a paramagnetic and electrically insulative core 36 that comprises a material with both paramagnetic and electrically insulative properties. Such embodiments may utilize, for example, iron oxides. Furthermore, such embodiments can negate or mitigate the need for a supplemental coating to achieve net insulative properties for the individual paramagnetic particle 35.

In some embodiments, such as that illustrated in part of FIG. 3, each individual paramagnetic particle 35 may comprise a conductive particle 38 and a nonmagnetic electrically insulative coating 39. In such embodiments, the conductive particles 38 may comprise any paramagnetic material that may also be at least partially electrically conductive. The individual paramagnetic particle 35 may thereby further comprise a nonmagnetic electrically insulative coating 39 to electrically insulate the underlying conductive particle 38.

In even some embodiments, the plurality of paramagnetic particles 30 may comprise some individual paramagnetic particles 35 that comprise a paramagnetic and electrically insulative core 36 (e.g., without a further coating) and some individual paramagnetic particles 35 a conductive particle 38 and a nonmagnetic electrically insulative coating 39. For example, one or more of the plurality of paramagnetic particles 30 can comprise a paramagnetic and electrically insulative core 36 and one or more of the plurality of paramagnetic particles 30 can comprise a conductive particle 38 and a nonmagnetic electrically insulative coating 39.

The plurality of paramagnetic particles 30 may comprise a variety of overall shapes, sizes, and combinations. For example, in some embodiments, the plurality of paramagnetic particles 30 may generally comprise an average particle size, wherein particle size refers to the largest dimension across an individual particle, and wherein average particle size refers to the average value for the plurality, of from 0.001 mm to 0.5 mm, or from 0.01 mm to 0.4 mm, or from 0.1 mm to 0.3 mm. The plurality of paramagnetic particles 30 may comprise substantially similar particle sizes or may comprise a variety of different particle sizes such as through a multimodal distribution of various particle sizes. Moreover, the plurality of paramagnetic particles 30 may comprise a variety of shapes such as, but not limited to, spherical, flakes, asymmetrical shapes, or combinations thereof.

In embodiments where the individual paramagnetic particle 35 comprises a nonmagnetic electrically insulative coating 39, the nonmagnetic electrically insulative coating 39 can comprise a variety of different thicknesses. For example, in some embodiments, the nonmagnetic electrically insulative coating 39 of the individual paramagnetic particle 35 may have an average thickness of from 0.001 mm to 0.01 mm, or from 0.005 to 0.009 mm. In some embodiments, the nonmagnetic electrically insulative coating 39 may comprise a substantially uniform thickness around the entire surface of the individual paramagnetic particle 35. In some embodiments, the nonmagnetic electrically insulative coating 39 may comprise a non-uniform thickness around the individual paramagnetic particle 35, such as wherein the thickness of the nonmagnetic electrically insulative coating 39 varies at different locations across the individual paramagnetic particle 35.

In some embodiments, the plurality of paramagnetic particles 30 can be provided with one or more various additives such as when provided in a collective powder or other form. In such embodiments, the optional one or more additional additives may comprise any material that may be utilized in powder metallurgy such as, for example, one or more consolidating agents (e.g., sintering agents).

The plurality of paramagnetic particles 30 may all comprise substantially the same composition (e.g., a substantially similar or consistent combination of the conductive particles 38 with the nonmagnetic electrically insulative coatings 39) or a variety of different compositions. In some embodiments, the plurality of paramagnetic particles 30 may comprise a portion of individual paramagnetic particles 35 having a first size, shape, and composition, and a portion of individual paramagnetic particles 35 having a second size, shape, and composition, wherein at least one of the size, shape, and composition parameters are different between some of the individual paramagnetic particles 35. It should thus be appreciated that the plurality of paramagnetic particles 30 may comprise all of the same or different compositions and/or properties within the scope of the embodiments disclosed herein.

With reference now to FIGS. 1-4, the plurality of soft ferromagnetic particles 20 and the plurality of paramagnetic particles 30 may be combined, such as to form a dual phase soft magnetic particle combination 10 (e.g., FIGS. 1A and 1B) and/or a component structure 50 (FIG. 4). As used herein, combine, combined, and variants thereof refers to any collective positioning of a plurality of particles, such as by combining them into a powder combination, combining them into a component shape, or otherwise mixing the plurality of particles, either directly or indirectly. For instance, a plurality of soft ferromagnetic particles 20 may be directly combined with a plurality of paramagnetic particles 30, one or both of the plurality of soft ferromagnetic particles 20 and the plurality of paramagnetic particles 30 may be initially combined with one or more additives or other materials prior to combining with the other of the plurality of soft ferromagnetic particles 20 or the plurality of paramagnetic particles, or a combination thereof.

As will be appreciated herein, the combined plurality of soft ferromagnetic particles 20 and plurality of paramagnetic particles 30 may further be heat treated to facilitate consolidating such as through sintering, fusing, bonding, or other joining between at least some of the plurality of soft ferromagnetic particles 20 and at least some of the plurality of paramagnetic particles 30. Consolidating (e.g., sintering, fusing, bonding, or other joining) may occur with or without a mold through a variety of potential techniques. For example, an unsintered or partially bonded component structure 50 may initially be formed comprising a plurality of soft ferromagnetic particles 20 and plurality of paramagnetic particles 30. The component structure 50 may further be heat treated so facilitate sintering or the like of the plurality of soft ferromagnetic particles 20 and plurality of paramagnetic particles 30 so as to ultimately produce a dual phase soft magnetic component 100. As will become appreciated herein, the heat treatment may occur sequentially with the combining process, may occur simultaneously with the combining process, or combinations thereof.

Figure 5:
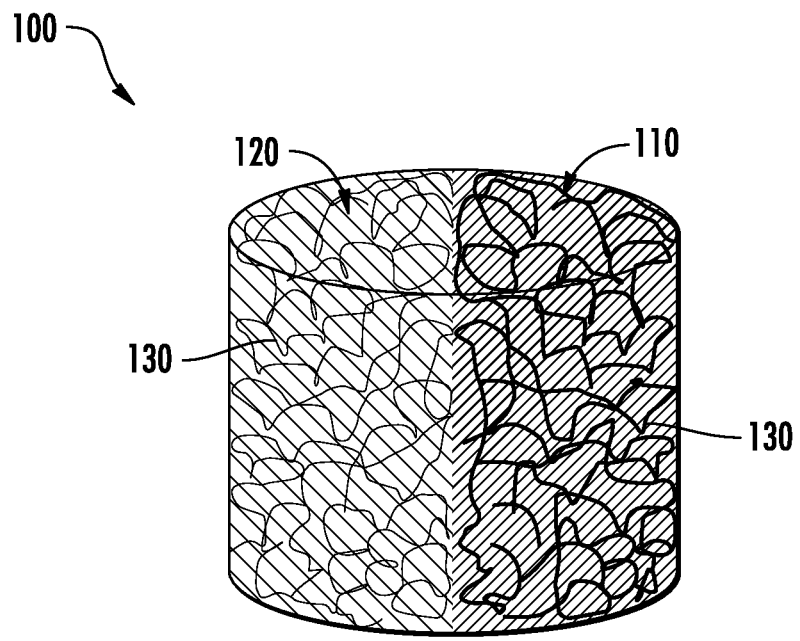
FIG. 5 illustrates a dual phase soft magnetic component in accordance with one or more exemplary aspects of the present disclosure.

Combining the plurality of soft ferromagnetic particles 20 and plurality of paramagnetic particles 30 to form a component structure 50 may occur through a variety of suitable mechanisms. For example, in some instances, the plurality of soft ferromagnetic particles 20 and plurality of paramagnetic particles 30 may be combined into one or more molds, such as molds of a component structure 50. In such examples, the plurality of soft ferromagnetic particles 20 and plurality of paramagnetic particles 30 may be combined together before, during and/or after being loaded into one or more molds which define the component structure 50. The combined plurality of soft ferromagnetic particles 20 and plurality of paramagnetic particles 30 in the mold can, for example, subsequently be pressed and/or heated to form a dual phase soft magnetic component 100 as illustrated in FIG. 5. Such embodiments may thereby use any powder metallurgy method to facilitate the loading, pressing, and/or heating steps such as, but not limited to, hot compaction, hot pressing, sintering, hot isostatic pressing, spark plasma sintering, brazing, powder extrusion, powder forging, powder rolling, thermal spraying, and thermal spraying.

Alternatively, or additionally, the plurality of soft ferromagnetic particles 20 and plurality of paramagnetic particles 30 may be combined via one or more additive manufacturing methods. Additive manufacturing technology may generally be described manufacturing technology in which components are manufactured in a layer-by-layer manner, such as via as fabrication of objects by building objects point-by-point, layer-by-layer, typically in a vertical direction. Exemplary additive manufacturing methods may utilize additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects using one or more of these methods may be generally monolithic in nature and may have a variety of integral sub-components.

Additionally or alternatively suitable additive manufacturing technologies include, for example, binder jet technology, cold spray technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, Binder Jet (BJ) technology, and/or other additive manufacturing technology that utilizes one or more energy beams or sources.

Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

Depending in part on the additive manufacturing method(s), the plurality of soft ferromagnetic particles 20 and the plurality of paramagnetic particles 30 may be placed with respect to one another in a variety of combinations. As discussed above, the plurality of soft ferromagnetic particles 20 and the plurality of paramagnetic particles 30 may be adjacent one another in distinct regions, partially mixed in different concentrations, or anything therebetween. Thus, the additive manufacturing method may, for example, separately place the plurality of soft ferromagnetic particles 20 and the plurality of paramagnetic particles 30 (e.g., via different powder feeders) to achieve the desired level of positioning and/or mixing of the plurality of soft ferromagnetic particles 20 and the plurality of paramagnetic particles 30 in the dual phase soft magnetic particle combination 10.

As a result of combining the plurality of soft ferromagnetic particles 20 and plurality of paramagnetic particles 30, and subsequent and/or simultaneous heat treating, a dual phase soft magnetic component 100 can be produced. The dual phase soft magnetic component 100 can thereby comprise a component that has a microstructure with one or more magnetic regions 110 and one or more nonmagnetic regions 120. For example, the one or more magnetic regions 110 may be formed via the plurality of soft ferromagnetic particles 20. Moreover, the dual phase soft magnetic component 100 can comprise one or more insulative regions 130 such as via the soft magnetic electrically insulative coatings 27 and/or nonmagnetic electrically insulative coatings 39. The one or more insulative regions 130 may thereby combine to form an insulation network within the dual phase soft magnetic component 100. The insulation network can extend throughout the entire dual phase soft magnetic component 100, including between the magnetic and non-magnetic regions. Thus, the insulation network can provide electrically insulative properties to the overall dual phase soft magnetic components 100, even in light of the various magnetic and non-magnetic properties. The various regions and properties may be relatively distributed throughout the dual phase soft magnetic component 100 as a result of initial placement of the plurality of soft ferromagnetic particles 20 and the plurality of paramagnetic particles 30. As a result, dual phase soft magnetic components 100 as disclosed herein may be monolithic and may have higher saturation flux density and/or lower eddy current loss.

Moreover, the dual phase soft magnetic components 100 disclosed herein may have a three dimensional magnetic flux flow direction from the isotropic structure of the parts. For example, based in part on the level of mixing of the plurality of soft ferromagnetic particles 20 and plurality of paramagnetic particles 30, the three dimensional magnetic flux may vary in direction and value across different regions of the dual phase soft magnetic component 100. The dual phase soft magnetic component 100 may thereby be tailored to obtain the desired respective magnetic flux properties across its shape and surface by maintaining the respective plurality of soft ferromagnetic particles 20 and plurality of paramagnetic particles 30 in respective regions with. For example, a first part of the dual phase soft magnetic component 100 may comprise the plurality of soft ferromagnetic particles 20 while a second part of the dual phase soft magnetic component 100 may comprise the plurality of paramagnetic particles 30. As a result, the first part of the dual phase soft magnetic component 100 will have a different magnetic flux flow direction and value with respect to the second part of the dual phase soft magnetic component 100. Depending on the design for the dual phase soft magnetic component 100, multiple permutations of the different regions may be strategically located about the dual phase soft magnetic component 100. These regions may vary in concentration of the respective plurality of soft ferromagnetic particles 20 and plurality of paramagnetic particles 30, either wholly or partially, to produce a highly tailorable dual phase soft magnetic component 100 with highly tailorable variations of three dimensional magnetic flux flow direction(s) and value(s). In sum, the localized magnetic and non-magnetic regions can reduce flux losses due to the relatively low and high magnetic permeability of the different regions with respect to one another. For instance, the magnetic regions can constrain the path of magnetic flux while the non-magnetic regions can enable the path for magnetic flux.

The dual phase soft magnetic component can comprise one or more of a variety of different potential components. For example, the dual phase soft magnetic component 100 may comprise one or more components of axial and/or transverse flux machines such as for motors and generators including, for example, for turbines. Such motors and generators may be utilized in, for example, automobile, aviation, robotic, and/or appliance applications.

Figure 6:
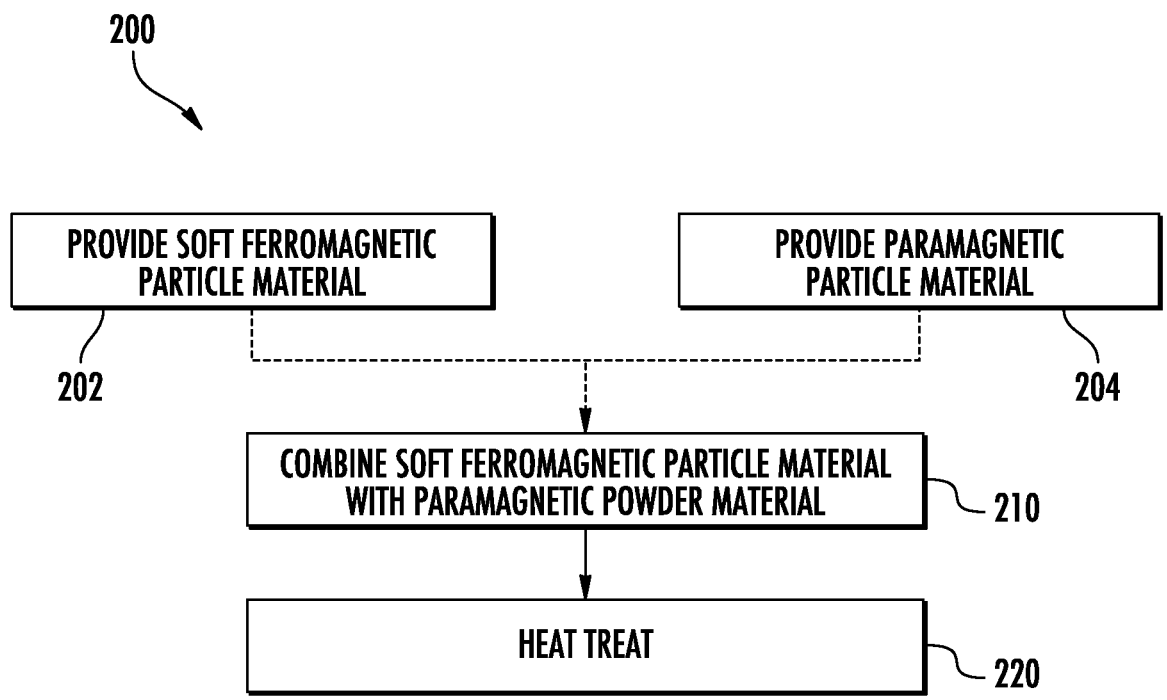
FIG. 6 illustrates a method for manufacturing a dual phase soft magnetic component in accordance with one or more exemplary aspects of the present disclosure.

With additional reference now to FIG. 6, a method 200 is illustrated for manufacturing a dual phase soft magnetic component 100.

In some embodiments, the method 200 may optionally comprise producing the plurality of soft ferromagnetic particles 20 in step 202 and/or producing the plurality of paramagnetic particles 30 in step 204. Such production may be achieved throughout any suitable means and be dependent on the specific type of plurality of soft ferromagnetic particles 20 and plurality of paramagnetic particles 30. For example, producing the plurality of soft ferromagnetic particles 20 in step 202 may comprise coating a plurality of soft ferromagnetic cores 26 with soft magnetic electrically insulative coatings 27. Likewise, producing the plurality of paramagnetic particles 30 in step 204 may comprise coating a plurality of conductive particles 38 with nonmagnetic electrically insulative coatings 39.

In some embodiments, the method 200 may not comprise the explicit steps of producing the plurality of soft ferromagnetic particles 20 in step 202 and/or producing the plurality of paramagnetic particles 30 in step 204. For example, the plurality of soft ferromagnetic particles 20 and/or the plurality of paramagnetic particles 30 may already be provided.

The method 200 can thereby either further comprise, or initially comprise, combining the plurality of soft ferromagnetic particles 20 and the plurality of paramagnetic particles 30 to form a component structure 50 in step 210.

As discussed above, combining the plurality of soft ferromagnetic particles 20 and the plurality of paramagnetic particles 30 may be achieved through any suitable mechanism such as molds, additive manufacturing, and/or other powder metallurgy manufacturing techniques. The plurality of soft ferromagnetic particles 20 and the plurality of paramagnetic particles 30 may be combined in a single step or through a plurality of iterations. For example, the plurality of soft ferromagnetic particles 20 and the plurality of paramagnetic particles 30 may be combined in step 210 as a pre-combined dual phase soft magnetic particle combination 10 being placed into a mold to thereby fill the mold in a single step. Alternatively, the plurality of soft ferromagnetic particles 20 and the plurality of paramagnetic particles 30 may be combined in a plurality of iterations, such as by disposing respective regions, concentrations, or mixtures of the plurality of soft ferromagnetic particles 20 and the plurality of paramagnetic particles 30.

Alternatively, or additionally, the plurality of soft ferromagnetic particles 20 and the plurality of paramagnetic particles 30 may be combined in step 210 through additive manufacturing by disposing various regions of the respective plurality of soft ferromagnetic particles 20 and/or the plurality of paramagnetic particles 30 to build the component structure 50 in a step-wise fashion. These regions may vary in concentration of the respective plurality of soft ferromagnetic particles 20 and plurality of paramagnetic particles 30, either wholly or partially, to produce a highly tailorable dual phase soft magnetic component 100 with highly tailorable variations of three dimensional magnetic flux flow direction(s) and value(s).

The method 200 may further comprise heat treating the component structure 50 in step 220. As discussed above, heat treating in step 220 can comprise any heating that facilitates the consolidation and formation of a dual phase soft magnetic component 100 such as by sintering, fusing, or otherwise joining the plurality of soft ferromagnetic particles 20 and the plurality of paramagnetic particles 30 that were, or are, combined to form the component structure 50. Furthermore, heat treating in step 220 can occur for a variety of different times and through a variety of different techniques.

In some embodiments, heat treating the component structure 50 in step 220 may occur subsequent to combining the plurality of soft ferromagnetic particles 20 and the plurality of paramagnetic particles 30 in step 210. For example, if the plurality of soft ferromagnetic particles 20 and the plurality of paramagnetic particles 30 are combined in step 210 by loading the plurality of soft ferromagnetic particles 20 and the plurality of paramagnetic particles 30 into a mold to form the component structure 50, the component structure 50 may subsequently be heat treated in step 220 to produce a dual phase soft magnetic component 100.

Alternatively, or additionally, heat treating the component structure 50 in step 220 may occur simultaneously, partially, or entirely, with combining the plurality of soft ferromagnetic particles 20 and the plurality of paramagnetic particles 30. For example, if one or more additive manufacturing techniques are used, the plurality of soft ferromagnetic particles 20 and the plurality of paramagnetic particles 30 can be simultaneously combined to form the component structure 50 and heat treated to form the dual phase soft magnetic component 100.

While method 200 is illustrated as at least comprising steps 210 and steps 220, it should be appreciated that method 200 may further comprise one or more additional manufacturing steps within the scope of the present disclosure. For example, method 200 may further include one or more processing, treating, or finishing steps to the plurality of soft ferromagnetic particles 20, the plurality of paramagnetic particles 30, the component structure 50, and/or the dual phase soft magnetic component 100.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method for manufacturing a dual phase soft magnetic component, the method comprising combining a plurality of soft ferromagnetic particles with a plurality of paramagnetic particles to form a component structure, wherein the plurality of soft ferromagnetic particles each comprise an electrically insulative coating; and, heat treating the component structure to consolidate the plurality of soft ferromagnetic particles with the plurality of paramagnetic particles.

The method of any claim herein, wherein the plurality of paramagnetic particles comprise a plurality of conductive particles each comprising a nonmagnetic electrically insulative coating.

The method of any claim herein, wherein the plurality of soft ferromagnetic particles comprise an intrinsic saturation flux density of about 0.4 Tesla or higher.

The method of any claim herein, wherein the plurality of soft ferromagnetic particles comprise an intrinsic saturation flux density of about 1.7 Tesla or higher.

The method of any claim herein, wherein the plurality of soft ferromagnetic particles and the plurality of paramagnetic particles are disposed within respective regions.

The method of any claim herein, wherein the dual phase soft magnetic component comprises one or more magnetic regions and one or more nonmagnetic regions.

The method of any claim herein, wherein the dual phase soft magnetic component comprises an insulation network extending throughout the one or more magnetic regions and one or more nonmagnetic regions.

The method of any claim herein, wherein the plurality of paramagnetic particles comprise austenitic steels, nickel based alloys, or a combination thereof.

The method of any claim herein, wherein combining the plurality of soft ferromagnetic particles with the plurality of paramagnetic particles comprises loading the plurality of soft ferromagnetic particles and the plurality of paramagnetic particles into a mold.

The method of any claim herein, wherein combining the plurality of soft ferromagnetic particles with the plurality of paramagnetic particles comprises additively manufacturing the component structure using the plurality of soft ferromagnetic particles and the plurality of paramagnetic particles.

The method of any claim herein, wherein the plurality of soft ferromagnetic particles have an average particle size from 0.001 mm to 0.5 mm.

The method of any claim herein, wherein one or more of the plurality of paramagnetic particles comprise a paramagnetic and electrically insulative core.

A dual phase soft magnetic particle combination comprising a plurality of soft ferromagnetic particles each comprising a soft magnetic electrically insulative coating; and, a plurality of paramagnetic particles.

The dual phase soft magnetic particle combination of any claim herein, wherein the plurality of paramagnetic particles comprise a plurality of conductive particles each comprising a nonmagnetic electrically insulative coating.

The dual phase soft magnetic particle combination of any claim herein, wherein the plurality of soft ferromagnetic particles each comprise an intrinsic saturation flux density of about 0.4 Tesla or higher.

The dual phase soft magnetic particle combination of any claim herein, wherein the plurality of soft ferromagnetic particles each comprise an intrinsic saturation flux density of about 1.7 Tesla or higher.

The dual phase soft magnetic particle combination of any claim herein, wherein the plurality of soft ferromagnetic particles and the plurality of paramagnetic particles are disposed within respective regions.

The dual phase soft magnetic particle combination of any claim herein, wherein the plurality of paramagnetic particles comprise austenitic steels, nickel based alloys, or combinations thereof.

A dual phase soft magnetic component comprising a plurality of soft ferromagnetic particles consolidated with a plurality of paramagnetic particles, wherein the plurality of soft ferromagnetic particles each comprise an electrically insulative coating; and, wherein the dual phase soft magnetic component comprises one or more magnetic regions and one or more nonmagnetic regions, and wherein the dual phase soft magnetic component comprises a three dimensional magnetic flux flow direction.

The dual phase soft magnetic component of any claim herein, further comprising an insulation network extending throughout the one or more magnetic regions and the one or more nonmagnetic regions.

We claim:

1. A method for manufacturing a dual phase soft magnetic component, the method comprising:
   combining a plurality of soft ferromagnetic particles with a plurality of paramagnetic particles to form a component structure, wherein the plurality of soft ferromagnetic particles each comprise an electrically insulative coating; and
   after combining the plurality of soft ferromagnetic particles with the plurality of paramagnetic particles, heat treating the component structure to consolidate the plurality of soft ferromagnetic particles with the plurality of paramagnetic particles,
   wherein the dual phase soft magnetic component comprises at least two distinct regions, and wherein the dual phase soft magnetic component has a microstructure with one or more magnetic regions comprising the plurality of soft ferromagnetic particles and one or more nonmagnetic regions comprising the plurality of paramagnetic particles.

2. The method of claim 1, wherein the plurality of paramagnetic particles comprise a plurality of conductive particles each comprising a nonmagnetic electrically insulative coating.

3. The method of claim 1, wherein the plurality of soft ferromagnetic particles comprise an intrinsic saturation flux density of about 0.4 Tesla or higher.

4. The method of claim 1, wherein the plurality of soft ferromagnetic particles comprise an intrinsic saturation flux density of about 1.7 Tesla or higher.

5. The method of claim 1, wherein the dual phase soft magnetic component comprises an insulation network extending throughout the one or more magnetic regions and one or more nonmagnetic regions.

6. The method of claim 1, wherein the plurality of paramagnetic particles comprise austenitic steels, nickel based alloys, or a combination thereof.

7. The method of claim 1, wherein combining the plurality of soft ferromagnetic particles with the plurality of paramagnetic particles comprises loading the plurality of soft ferromagnetic particles and the plurality of paramagnetic particles into a mold.

8. The method of claim 1, wherein one or more of the plurality of paramagnetic particles comprise a paramagnetic and electrically insulative core.

9. The method of claim 1, wherein the plurality of soft ferromagnetic particles and the plurality of paramagnetic particles are combined into a powder combination.

10. A dual phase soft magnetic particle combination comprising:
    a plurality of soft ferromagnetic particles disposed in a magnetic region, the plurality of soft ferromagnetic particles each comprising a soft magnetic electrically insulative coating; and
    a plurality of paramagnetic particles disposed in a nonmagnetic region distinct from and adjacent to the magnetic region, wherein the plurality of paramagnetic particles comprise a plurality of conductive particles each comprising a nonmagnetic electrically insulative coating thereon.

11. The dual phase soft magnetic particle combination of claim 10, wherein the plurality of soft ferromagnetic particles each comprise an intrinsic saturation flux density of about 0.4 Tesla or higher.

12. The dual phase soft magnetic particle combination of claim 10, wherein the plurality of soft ferromagnetic particles each comprise an intrinsic saturation flux density of about 1.7 Tesla or higher.

13. The dual phase soft magnetic particle combination of claim 10, wherein the dual phase soft magnetic particle combination is a powder combination.

14. A dual phase soft magnetic component comprising:
    a plurality of soft ferromagnetic particles consolidated with a plurality of paramagnetic particles, wherein the plurality of soft ferromagnetic particles each comprise an electrically insulative coating; and
    wherein the plurality of soft ferromagnetic particles with the paramagnetic particles are sintered or fused together with the paramagnetic particles, and wherein the dual phase soft magnetic component comprises one or more magnetic regions comprising the plurality of soft ferromagnetic particles and one or more nonmagnetic regions comprising the plurality of paramagnetic particles, and wherein the dual phase soft magnetic component comprises a three dimensional magnetic flux flow direction, wherein each magnetic region is distinct from and adjacent to at least one nonmagnetic region.

15. The dual phase soft magnetic component of claim 14, further comprising an insulation network extending throughout the one or more magnetic regions and the one or more nonmagnetic regions.

* * * * *